United States Patent [19]

Makow

[11] Patent Number: 4,893,906
[45] Date of Patent: Jan. 16, 1990

[54] DISPLAY FORMS USING LIQUID CRYSTALS

[76] Inventor: David M. Makow, 14 Davidson Crescent, Gloucester, Ontario, Canada, K1J 6M2

[21] Appl. No.: 165,821

[22] Filed: Mar. 9, 1988

[30] Foreign Application Priority Data

Mar. 17, 1987 [CA] Canada ........................ 532251

[51] Int. Cl.$^4$ ..................... G02F 1/133; C09K 19/00
[52] U.S. Cl. ........................... 350/350 R; 350/334; 350/351; 428/1
[58] Field of Search ............ 350/351, 350 R, 334, 350/331 T; 428/1

[56] References Cited

U.S. PATENT DOCUMENTS 3,533,399 10/1970 Goldberg et al. .................. 350/351
3,666,948 5/1972 Mechlowitz et al. ............... 350/351

OTHER PUBLICATIONS

*Licristal* TM *Liquid Crystals* by EM Laboratories Inc., Dec. 1972.

*Primary Examiner*—Stanley D. Miller
*Assistant Examiner*—Anita P. Gross

[57] ABSTRACT

In a display device, planar or curved, panel or colored pane it is known that the image or the colors do not change noticeably with the angle of viewing or angle of illumination. In this invention drastic changes in the image and colors can be obtained using cholesteric or other chiral liquid crystal coatings or polymers with liquid crystalline properties. In addition the colors are more intense than feasible with other colorants. These two properties are value in applications where it is desired to attract the viewers attention such as in advertising and signage. In a colored pane consisting of ornamental or stained glass parts it is known that the process of achieving the desired image effects is not simple and limited in scope. Using liquid crystal coatings the process of achieving such effects is greatly simplified and less expensive. By providing two or more liquid crystal coatings on transparent substrates overlaying each other new colors and three-dimensional effects can be obtained as a result of the color additive properties of liquid crystals coatings which do not absorb light.

15 Claims, 1 Drawing Sheet

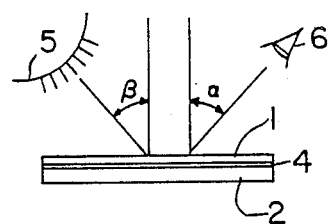
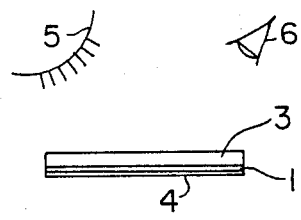
FIG.1    FIG.2
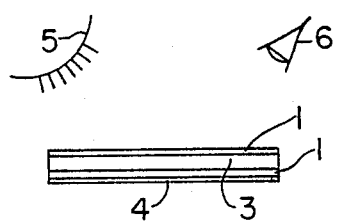
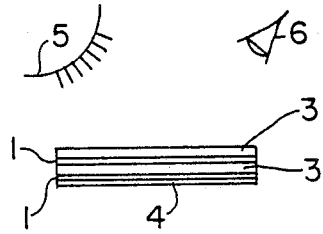
FIG.3    FIG.4
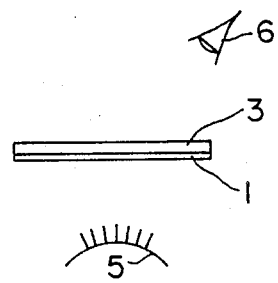
FIG.5

DISPLAY FORMS USING LIQUID CRYSTALS

BACKGROUND OF THE INVENTION (1) Field of the Invention

This invention relates to suitably illuminated display devices, planar or curved, panels or panes such as used in commercial advertising, signage, teachings and decorative purposes, some fine arts forms such as paintings, reliefs, sculpture and jewellery objects. It also relates to ornamental decorative partitions, window panes and stained glass forms where the illuminant can be daylight or an artificial light source. The invention exploits the properties of cholesteric or other chiral liquid crystal coatings deposited on transparent substrates that show intense colours when the reflected light from the image coated panels having a dark backing is viewed and shows complementary colours when the light source is behind the panel and the transmitted light through the panel and image is viewed. It exploits the remarkable property of such liquid crystal coatings where the colours perceived change with the angle of viewing and the angle of illumination. It exploits the fact that the coatings don't absorb light and thus superimposed coatings are transparent to each other and their colours mix additively like coloured lights.

(2) Description of Prior Art

The prior art related to this invention is: (1) Cdn. Pat. No. 956159, issued on Oct. 15, 1974 to E. J. Stevens et al, entitled Polychroic Films; (2) Cdn. Pat. No. 704348, issued on Feb. 23, 1965 to Moray and Doris MacNaughton, entitled Illuminated Decorative Panels; (3) Cdn. Pat. No. 445944, issued on Jan. 6, 1948 to Jean Crotti, entitled Processes for Obtaining Multicoloured Effects Similar to Those of Stained Glass Window and Products Resulting Therefrom; (4) Cdn. Pat. No. 1168905, issued on June 12, 1984 to Aldo Colombo, entitled Extended Temperature Range Thermographic Screen to Detect Temperature Anomalies at the Skin; (5) Cdn. Pat. No. 1110052, issued on Oct. 6, 1981 to James Ferganson, entitled Composition for Liquid Crystal Thermometry; (6) Cdn. Pat. No. 1180541, issued on Apr. 2, 1985 to Heino Finkelman et al, entitled Crosslinked Organopolysiloxanes Having Liquid Crystalline Properties; (7) U.S. Pat. No. 3,533,399 filed Aug. 2, 1965 by Newton N. Goldberg et al, entitled Temperature Sensing Means and Methods; and (8) U.S. Pat. No. 3,666,948, filed Jan. 6, 1971 by Bela Mechlowitz et al, entitled Liquid Crystal Thermal Imaging System Having an Undisturbed Image on a Disturbed Background.

In the prior art forms of display panels or panes used in the above mentioned applications, light absorbing pigmented colourants having a limited colour gamut were employed. Liquid crystals of the cholesteric type have a large colour gamut than such colourants and therefore more intense colours can be realized. The colours of prior art display forms or panels are static in the sense that they appear almost the same irrespective of the direction of viewing and illumination. In many cases of advertising, signage, jewellery objects and display applications it is desirable to attract the passerby's attention. Liquid crystal images fulfill admirably this goal as a drastic colour change is perceived by a viewer as he moves past such a display. This colour change is due to light interference phenomena between the oriented molecular layers of liquid crystal mixtures. In the prior art it has been known that certain light interference dielectric coatings possess also such colour-viewing angle dependence properties. Such coatings, however, have not been used for the display panels referred to as the process and the creation of images is not simple and is expensive. Therefore such interference coatings found applications in large scale mass produced single colour products such as special uniformly coloured panes for windows. In other attempts to achieve viewing angle dependent colour effects vertical coloured strips were mounted on a supporting base (Cdn. Patent No. 956159 ref. 1), resulting in a complicated structure. In the prior art ornamental and stained glass displays have been formed by assembling or fixing together suitably shaped pieces of coloured glass (Cdn. Patent No. 704348 ref. 2 and Cdn. Patent No. 445944 ref. 3). The above mentioned devices or processes are time consuming and the freedom to create complicated and complex images is considerably restricted. These limations, as will be described below, are substantially eliminated by the use of liquid crystal coatings.

This invention deals with the use of cholesteric or other chiral liquid crystal coatings on suitable opaque, transparent, translucent or diffusing planar or nonplanar substrates and may utilize one or more such coated substrates fully or partly overlaying or joined together, side by side or with the surfaces at an angle. In the prior art liquid crystal materials have been applied mostly to flexible substrates such as paper, plastic or rubber membranes. Also the liquid crystal materials, usually cholesterol esters, were encapsulated in small (10–50 $\mu$m) plastic capsules or they were imbedded in plastic compounds in order to protect the liquid material from deterioration. In such encapsulated cholesteric liquid crystals however the colours are not as intense, particularly the yellows, oranges and the reds. These products were used mainly for thermography or thermometry (Cdn. Patent No. 1168905 ref. 4; Cdn. Patent No. 1110052 ref. 5; U.S. Pat. No. 3,533,399 ref. 7 and U.S. Pat. No. 3,666,947 ref. 8). They were based on the colour-temperature dependence of some liquid crystal mixtures in which the colour is the indication of the temperature of the object being investigated. To my knowledge the change of colour with angle of viewing of liquid crystals have not been taken advantage of in display forms, panels or panes to date. In the prior art the properties of liquid crystals, of interest to any application, existed within the so called mesomorphic temperature range. Above this range the material becomes a colourless isotropic liquid; below this range it becomes a colourless solid. To date, the mesomorphic temperature range of the liquid crystal mixtures that were chosen for practical products had to coincide with the temperature range such products were intended to operate.

SUMMARY OF THE INVENTION

In this invention the advantage is taken of the special property of certain polymer and polysiloxanes having cholesteric liquid crystals properties (Cdn. Patent No. 1185401 ref. 6) in which, when cooled below the mesomorphic temperature range, the orientation of the molecules is frozen and preserved and the colours become a permanent aspect of the solid coating. The material therefore doesn't require encapsulation and thus equal intensity for all colours across the whole visible spectrum is preserved. Gradually such a polymer material is applied to the substrate in liquid form and thus it has to be heated into the mesomorphic temperatures which, depending on the type of material can start at 50° C. to 100° C. The image can be created on the substrate by applying the liquid crystal material by free hand using either a brush, roller, spreader or any other suitable means or by using masking or silk-screening methods. When cooled, back to ambient temperatures, the material from a tough coloured coating on the substrate. The coating doesn't require any additional protection and the colours in the case of polysiloxane materials are not affected by ultraviolet light or impurities of the environment.

It is the object of this invention to provide displays that will attract the attention of passer-by's more effectively than displays of the prior art. This is accomplished by using certain liquid crystal coatings which dramatically change colours with the angle of viewing and produce intense colours.

It is a further object of this invention to produce a reflective display in which the colour gamut is greater than feasible to date and in which the colours due to the additive colour properties of liquid crystal can be subtly changed by the suitable choice of the texture and colours of the substrate. In the case of a transparent substrate its back surface can be clear, coloured or coated again with liquid crystals or a second suitably coloured panel or another liquid crystal coated panel can be placed behind, fully or partly overlaying or with its surfaces at an angle to the first panel. In the case of the latter yet another or more panels can be added in the background as liquid crystal coatings don't absorb light and thus a special 3-dimensional effect can be obtained. Also in the case of two or more coatings some coatings could be prepared to reflect at least one or more infrared wavelengths which would then become visible only at certain angles of viewing, thus creating an impression of movement of the image.

It is still a further object of this invention to produce a transmissive or back-lighted display in which the light source or natural light is behind the transparent substrate coated with liquid crystals. Such display will then acquire some of the characteristics of stained glass or ornamental pane or partition. It will pass more light than possible with other colourants, since, as said in the foregoing, the liquid crystal coatings unlike other colourants don't absorb light. In such a display the image is produced using liquid crystals of several colours and can be produced by suitable tools or brushes, by silk-screening or masking techniques or by additional suitably shaped boards.

It is still a further object of the invention to provide a combined reflective-transmissive display in which the background used for the reflective mode of operation is periodically illuminated or substituted by a source of light. Such a display would occur naturally when the transparent substrate coated with liquid crystals is used as a window pane. At night when the interior of the enclosure is illuminated and the exterior is dark the reflected image would be seen from the inside; at day time when daylight is transmitted through the coated transparent substrate, the transmitted image having complementary colours to those in the reflective mode would be seen.

BRIEF DESCRIPTION OF THE DRAWINGS

The drawings which illustrate the principles of the invention may be modified and changed as regards the immediate illustration, hereinafter defined and claimed.

FIG. 1 is one embodiment of the invention showing diagrammatically a cross-section of the display when viewed in reflected light where $\alpha$ is the angle of viewing and $\beta$ the angle of illumination.

FIG. 2 is a variation of the embodiment shown in FIG. 1 using a transparent substrate.

FIG. 3 is a variation of the embodiment shown in FIG. 2 in which the transparent substrate is coated on both sides with liquid crystals.

FIG. 4 is an extension of the embodiment shown in FIG. 2 using the transparent substrates coated with liquid crystals one of top of the other.

FIG. 5 is a variation of the embodiment shown in FIG. 2 when viewed in transmitted light.

Further variations of the embodiments shown in FIGS. 1, 2 and 5 as for example depicted in FIGS. 3 and 4 can be readily adapted to transmitted light and can consist of more than two transparent substrates.

DESCRIPTION OF THE PREFERRED EMBODIMENTS

In the preferable embodiments of the invention shown in FIG. 1 the liquid crystal materials (1) used are of polymer and especially of the polysiloxane type available from Wacker-Chemie in Munich. They provide a tough coating that adheres well to the substrate. The substrate (2) used was metal, wood, textiles or plastics and was coated with a black or coloured coat (4). The source of light (5) could be any suitable artificial lighting such as incandescent or fluorescent and using light diffusers if required, or could be natural light.

In the preferable embodiment of the invention as a reflective display form shown in FIG. 2 a transparent planar or nonplanar substrate (3) made of plexiglass, plastic polycarbonate or glass was coated on one side with liquid crystals (1) to create the desired image using the means and methods described in the foregoing. The coated side was then painted with a black coat (4) unless a black background was provided, in order to obtain the most intense colours. Alternatively the coated side could be painted with another colour or several colours in order to achieve new colour effects that result from the additive colour properties of the non-light absorbing liquid crystal coatings. The use of the latter method created a superposition of images which gave a special 3-dimensional effect. The uncoated side of the transparent substrate (3) may preferably face the light source and the viewer. In such an arrangement the substrate itself protects the image from the handling and environmental effects and eliminates the need of a protective transparent window. In case of UV absorbing substrates such as certain types of plexiglass and plastics it also protects the image from the effects of ultraviolet radiation if such effects have been noted.

In an alternative embodiment of the invention shown in FIG. 3 the transparent substrate (3) was coated on both sides with liquid crystal (1) and then with a black or coloured coat (4) also creating a 3-dimensional effect. In a further alternative embodiment of FIG. 2, the coated side, instead of being painted could also be attached to another image carrying substrate to obtain a similar effect as shown in FIG. 4. The substrate and any additional panels can be enclosed in a suitable box, if required. In certain applications it was desirable to see the texture of the liquid crystal coating; then the coated side of the substrate was exposed to the viewer.

In the preferable embodiment of the invention as a transmissive or back-lighted display from shown in FIG. 5 the arrangements were substantially the same as above except that the liquid crystal image was not coated with a black or coloured coat. The source of light (5) illuminated the liquid crystal coated side and the uncoated side of the subtrate was exposed to the viewer or in reverse. The light source and the image carrying substrate could be enclosed in a suitable box having a provision for adequate ventilation. In other applications of the transmissive embodiment of the invention a box was not required and the substrate was framed like a pane. The light source or natural day-light illuminated from a distance the suitably mounted image-carrying substrate and additional coated substrates, if any.

While the preferred embodiment of the invention has been explained and illustrated it will be appreciated that the invention is not restricted to these specific forms but it may consist of further embodiments and is of broader scope as defined by the claims.

The embodiments of the invention in which an exclusive property or privilege is claimed are defined as follows:

1. A display device comprising a light source, a panel with an interior and exterior surface, said exterior surface exposed to an onlooker and being on the reverse side of said panel, relative to said internal surface, at least a portion of said panel being coated with a liquid crystal coating which has a melting point above its operating temperature, and which is perceived as changing colour with a change in the angle between the line from said onlooker to a point which is viewed on the said exterior surface of said panel and the said exterior surface, or with the change in the angle between a line from said light source to a point on said exterior surface which is being viewed and a said exterior surface.

2. A display device as described in claim 1, wherein said liquid crystal is a polymer having liquid crystaline properties.

3. A display device as described in claim 2, wherein said liquid crystal is a polysiloxane polymer having liquid crystaline properties.

4. A display device as described in claim 1, wherein said panel has a planar exterior and/or interior surface.

5. A display device as described in claim 4, wherein said panel has a nonplanar exterior and/or interior surface.

6. A display device as described in claim 5, wherein said panel is opaque.

7. A display device as described in claim 5, wherein said panel is translucent and said coating is coated on said interior surface, said exterior surface or both.

8. A display device as described in claim 5, wherein said panel is transparent, and said coating is coated on said interior surface, said exterior surface or both.

9. A display device as described in claim 6, 7 or 8, wherein more than one coating of said liquid crystal on said internal and/or external surface is provided.

10. A display device as described in claim 6, 7 or 8, wherein said panel is made from a material selected from the group including plastic and glass.

11. A display device as described in claim 6, 7 or 8, wherein a plurality of said panels are provided overlaying one another.

12. A display device as described in claim 6, 7 or 8, wherein at least two of said panels are provided, joined together fully or partly overlaying, side-by-side or joined with their surfaces or edges at different angles with respect to each other to form a relief, a sculpture or a jewellery object.

13. A display device as described in claim 6, 7 or 8, wherein said display device is an advertising, alerting or informative display or sign, suitably framed, supported or enclosed for outdoor or indoor use.

14. A display device as described in claim 6, 7 or 8, wherein said display device is a decorative window pane.

15. A display device as described in claim 6, 7 or 8, wherein said display device is a decorative partition.

* * * * *